United States Patent [19]

Boissevain et al.

[11] Patent Number: 5,045,342

[45] Date of Patent: Sep. 3, 1991

[54] INDEPENDENT HEAT MOISTURE CONTROL SYSTEM FOR GLOSS OPTIMIZATION

[75] Inventors: Mathew G. Boissevain, Los Altos, Calif.; Pierre Charette, St. Hippolyte; Fernand Ostiguy, St. Lambert, both of Canada; Barclay W. Wallace, San Jose, Calif.

[73] Assignee: Measurex Corporation, Cupertino, Calif.

[21] Appl. No.: 303,480

[22] Filed: Jan. 27, 1989

[51] Int. Cl.$^5$ .............................................. B05D 3/12
[52] U.S. Cl. ...................................... 427/8; 427/366; 427/361; 427/377; 118/665; 118/117
[58] Field of Search .................... 427/361, 366, 8, 377, 427/378; 118/665, 117, 68

[56] References Cited

U.S. PATENT DOCUMENTS

| | | | |
|---|---|---|---|
| 2,146,281 | 2/1939 | Anderson | 427/361 X |
| 2,291,616 | 8/1942 | Fletcher | 427/361 X |
| 2,565,152 | 8/1951 | Wachter et al. | 427/377 |
| 3,338,736 | 8/1967 | Ham | 427/361 X |

Primary Examiner—Shrive Beck
Assistant Examiner—Alain Bashore
Attorney, Agent, or Firm—Spensley Horn Jubas & Lubitz

[57] ABSTRACT

A gloss control system is provided for controlling the surface gloss of a sheet material. The system provides separate and independent control of heat and moisture applied to the sheet material, rather than the fixed ratio of heat and moisture applied by previous steam shower systems. Heat may be applied by a plurality of infrared lamps whose radiation is directed to the sheet material surface. A plurality of upwardly facing atomizing spray nozzles act to provide streams of atomized water directed at the surface of the sheet material. A scanning gloss sensor detects the degree of surface gloss of the sheet material at various cross-directional locations and control the application of heat and moisture in accordance with the detected surface gloss to thereby achieve a desired gloss profile.

13 Claims, 4 Drawing Sheets

INDEPENDENT HEAT MOISTURE CONTROL SYSTEM FOR GLOSS OPTIMIZATION

BACKGROUND OF THE INVENTION

1. Field of the Invention

The present invention relates to the field of treating sheet materials pressed against rotary drums after being treated with heat and/or moisture and, more particularly, to an apparatus for controlling the surface gloss of a calendered paper sheet.

2. Background of the Related Art

One of the aspects by which sheet materials are graded is the gloss of the sheet surface. For example, paper may be categorized into various grades of paper having different degrees of surface gloss for various applications. Bulk paper is typically produced in a continuous sheet that is wound in a roll. The paper roll may have a dimension in the cross-direction, that is, across the width of the sheet, of 25 feet or more. The continuous sheet may then be unrolled and cut into individual sheets of the desired size. The consistency of the surface gloss of the individual sheets depends upon the uniformity of the surface gloss of the original bulk paper roll. Thus, it is very important to have a uniform surface gloss across the continuous bulk paper roll.

Paper production of a bulk paper roll typically involves a calendering process that includes pressing the paper sheet material between calender rolls to obtain the desired characteristics. For example, subjecting a paper sheet to the calendering process can change its density, thickness, smoothness, and gloss. Gloss is conventionally controlled by applying steam to the surface of the paper, followed by pressing the paper sheet between a series of calender rolls. Typically, the series of calender rolls are arranged in a stack, alternating between hard, polished steel rolls and soft, resilient rolls made of cotton. The paper absorbs the heat and moisture of the steam, and paper fibers at the sheet surface are softened. As the polished steel roll comes into contact with the paper surface that has been treated with steam, the paper surface is smoothed and pressed flat by the pressing and rubbing action of the hard steel roll against an adjacent soft roll, producing a glossy finish on the surface of the paper facing the steel roll. The process is not unlike treating a laundered shirt with a steam iron and ironing board to produce a smoother, brighter, and more glossy shirt surface. The degree of gloss is dependent on the amount of heat, moisture and pressure applied. Coatings may also be applied to the sheet material to further control the degree of gloss.

A common problem encountered in making a glossy finish on a paper surface using a steam treatment is the non-uniformity of the glossy finish. As noted, it is important to have a uniform surface gloss across the entire bulk paper roll. Variations in the glossy finish may be a result of localized variations in the amount of steam applied to the paper and other variables in the calendering process, such as localized temperature variations and changes in the calender roll pressure. It is known to independently vary the amount of steam directed at the sheet material in different sections of the sheet in the cross-direction of the paper surface, thereby obtaining a more uniform gloss finish. The independent variation may be achieved by a sectionalized steam shower comprising a plurality of steam nozzles distributed across the paper sheet in the cross direction. This is discussed, for example, in commonly assigned U.S. Pat. No. 4,786,529 to Boissevain.

A potential problem with many systems that regulate the amount of steam applied to the surface of paper lies with the fact that steam is used. Saturated steam is normally employed in such systems so that, upon contact with the sheet, the condensing steam will liberate a substantial amount of heat energy to the sheet. For saturated steam at a given pressure, the relationship between moisture and heat is fixed. Thus, for a given volume and flow of steam applied to a paper surface, there will be a given amount of heat and water in the steam. For example, it has previously been discussed that a coating may be applied to the paper in order to control the gloss of the surface finish. With some coatings, applying steam to the paper beyond a given amount causes the coating to separate from the sheet surface. In this situation, the amount of steam applied must then be decreased. Depending on the coating and paper involved, the coating may become separated from the sheet because of either too much moisture or too much heat. However, decreasing the amount of steam applied to the paper also decreases the amount of both heat and moisture applied to the paper. Decreasing both heat and moisture may adversely affect other aspects of the paper quality, such as smoothness. Accordingly, the present inventors have realized that it would be desirable to control the separation of the coating from the paper while maintaining other aspects of paper quality, such as the smoothness or gloss of the paper surface, by separately and independently controlling the amount of heat and moisture applied to the paper.

Another problem associated with applying steam to paper in order to control surface gloss is condensate dripping. When steam is directed at a paper surface, not all of the steam is deposited on the paper. Due to the high temperature of the steam and the speed of the steam flow, the steam has a great deal of kinetic energy. Some of the steam bounces off of the surface of the paper and condenses on the machinery associated with the calendering process. When enough of the steam has condensed, water droplets may form and drip onto the continuous paper sheet making its way through the calender stacks. This produces a localized variation in the amount of moisture applied to the paper sheet. This again results in a localized variation in the gloss finish of the sheet material. In addition, steam may condense on a cooler portion of paper surface or on the steel roll itself, again affecting amount of moisture applied to the paper surface and the surface gloss of the paper.

In addition to condensate dripping, another problem associated with applying steam to the paper surface is that the steam, intended to effect gloss, also tends to heat the paper which, in turn, heats the steel calender roll When the steel calender roll is heated, it expands slightly. This changes the pressing action at the location where the steel roll meets the soft roll, also referred to as the nip. As noted previously, the calendering process changes the density, thickness, smoothness, and gloss of the paper sheet. Thus, unintentional changes the pressing action of the steel roll against the soft roll results in changes to the calendering process that cannot be accurately predicted and that may adversely affect paper quality.

SUMMARY OF THE INVENTION

The present invention is directed to a system for controlling the gloss finish on the surface of a sheet material, such as paper, by separately and independently controlling the amount of heat and moisture directed at various cross-directional regions of the surface of the sheet material. The invention provides a means for increasing or decreasing the amount of heat applied to the paper surface while simultaneously and independently varying the amount of moisture applied to the same sheet surface. The invention also provides a means for independently controlling and/or substantially decoupling the effects on gloss and caliper caused by the calendering process.

In a preferred embodiment illustrated in the attached drawings, the system of the present invention comprises two separate housings located adjacent a first surface of the sheet material. As noted, for purposes of explanation, the sheet material referred to in this discussion will be assumed to be paper. The system includes a means for directing heat at the first surface of the paper while simultaneously and independently directing a stream of atomized water or "mist" at the same paper surface. The heat and moisture are applied to the paper surface prior to the point at which the sheet material is pressed between a hard, steel roll and an adjacent resilient, cotton roll to thereby create a glossy finish on the side of the paper that comes in contact with the steel roll.

A first one of the housings includes a plurality of spray nozzles for directing streams of atomized water at the first surface of the sheet material. The atomized water streams are preferably directed upwardly. The upward spray reduces the chance of large (unatomized) water droplets dripping from the nozzles down onto the paper, which would produce an uncontrollable localized variation in the moisture applied to the paper and adversely affect paper quality control. A second housing provides a means for directing heat at the first surface of the sheet material.

The second housing preferably radiates heat from a plurality of infrared lamps. A flat face of the second housing adjacent the first surface of the paper preferably includes a heat resistant quartz panel behind which the infrared lamps are located. Preferably, a plurality of long, narrow infrared lamps are used where one or more of the lamps may be controlled to provide a different amount of heat as compared to the other lamps This provides a non-uniform distribution of heat in the cross-direction of the sheet, and thus sectionalized control of the sheet heating in the cross direction. Each end of the lamps includes metal contacts that are joined to electrical connections that in turn are connected to a control device for providing sectionalized control over the amount of heat delivered to the paper.

The first and second housings are located adjacent the first surface of the sheet material prior to the point at which the first surface of the sheet material comes into contact with the hard calendar roll. Preferably, the flat face of the second housing is located as close as possible to the first surface of the paper. This is desirable because the radiation of heat from the infrared lamps follows an inverse square relationship, the heat radiated decreasing in an inverse squared relationship to the distance from the paper. For example, doubling the distance of the lamp from the paper reduces the heat at the paper to one fourth.

The radiation of the infrared lamps is directed out through the quartz panel onto the first surface of the paper. In the preferred embodiment, the infrared radiation is also reflected toward the first surface of the paper, for example, using a reflective material located behind the lamps, on the side of the lamps opposite the quartz panel. Care must be taken to provide sufficient cooling for the lamps and their electrical connections, as intense heat is generated in the vicinity of the lamps. The housing also includes a sufficient airflow (or flow of other working fluids) to cool the metal contacts of the lamps and prevent deterioration and melting of the electrical connections.

In an alternate embodiment illustrated in the attached drawings, the system of the present invention again comprises two separate housings located adjacent a first surface of the sheet material, but incorporates a means for directing a heated stream of air at the first surface of the paper, rather than using infrared radiation from a plurality of lamps. As before, streams of atomized water may be simultaneously and independently directed at the same paper surface. The heat and moisture are applied to the paper surface prior to the point at which the sheet material is pressed between a hard, steel roll and an adjacent resilient, cotton roll to thereby create a glossy finish on the side of the sheet material that comes in contact with the steel roll.

In the alternate embodiment, a first one of the housings includes a plurality of spray nozzles for directing streams of atomized water at the first surface of the sheet material. As before, the atomized water streams are preferably directed upwardly. Again, this reduces the chance of water dripping from the nozzles down onto the paper. A second housing provides a means for directing streams of heated air at the first surface of the sheet. A flat face of the second housing adjacent the first surface of the paper includes a plurality of holes through which the streams of heated air pass before coming into contact with the paper. A plurality of plenum chambers are located in the housing directly behind the holes and disposed at intervals along the cross-direction of the moving sheet. Each plenum chamber includes an air opening through which a stream of heated air enters each chamber. In the alternate embodiment, the holes of the flat housing face are small in diameter and numerous. The large number of small holes provide a uniform distribution of heated air to the sheet, while still providing sectionalized control of heating without excessive cost and complexity. The first and second housings are located adjacent the first surface of the sheet material prior to the point at which the first surface of the sheet material comes into contact with the hard calender roll.

In yet another embodiment, the separate heat and moisture supply housings are combined into a single housing. A flat face of the housing adjacent the first surface of the paper includes a plurality of holes through which the heat and moisture pass before coming into contact with the paper. Immediately behind the holes in the housing are a plurality of plenum chambers located within the housing and again disposed at intervals in the cross-direction. Each plenum chamber includes an opening into which an atomized water spray nozzle is fitted. A valve controls the water flow rate or water pressure delivered to each of the spray nozzles. Each plenum chamber also includes an air opening through which a stream of heated air is directed into the chambers. The heated air and the water spray forced into the chamber mix within the plenum chambers and then pass through the plurality of holes in the flat face of the housing and into contact with the first surface of the sheet material.

In any of the embodiments, the means used to provide heat preferably comprises a structure that provides sectionalized, independent control of heat to various sections of the paper in the cross-direction. This is also true of the moisture applying apparatus.

To maintain a uniform glossy finish on the sheet material, the degree of gloss is monitored using a gloss sensor and the distribution of heat and moisture are independently adjusted accordingly to maintain the desired gloss profile across the width and along the length of the sheet. The gloss sensor monitors the degree of glossy finish on the surface of the sheet material at intervals in the cross-direction of the sheet and generates a signal corresponding to the gloss at each interval. The signals from the gloss sensor are then provided to a control device that independently adjusts control valves controlling the amount of water discharged from the spray nozzles at each cross-directional interval and/or the amount of heat generated by the forced air heaters or infrared lamps at such cross-directional intervals.

DETAILED DESCRIPTION OF THE PREFERRED EMBODIMENTS

The following description is of the best presently contemplated mode of carrying out the invention. This description is made for the purpose of illustrating the general principles of the invention and should not be taken in a limiting sense. The scope of the invention is best determined by reference to the appended claims. In the accompanying drawings, like numerals designate like parts in the several figures.

Figure 1:
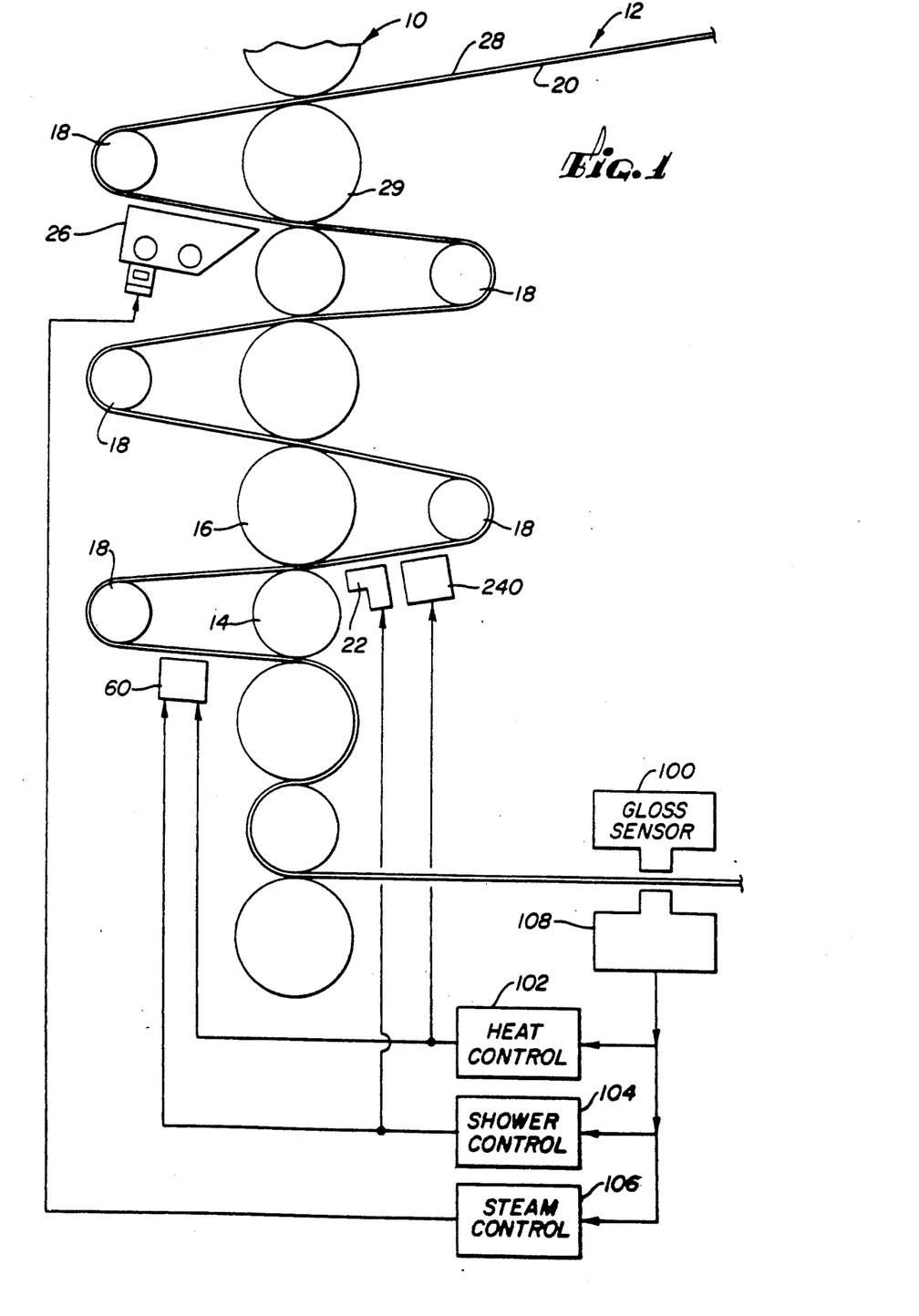
FIG. 1 is a side view illustrating a series of calender rolls for production of a sheet material.

FIG. 1 shows an example of a process in which the present invention may be applied. Illustrated in FIG. 1 is a system of calender rolls 10 suitable for pressing a sheet material, such as paper 12. For purposes of this discussion, the sheet material will be understood to be paper. (However, the present invention is not limited solely to use with paper.)

At least one of the calender rolls has a highly polished hard surface typically made of steel. This hard polished roll will be referred to as a steel roll 14. Positioned adjacent to the steel roll 14 is a roll having a somewhat resilient surface and which is typically made of cotton. The soft, resilient roll will be referred to as a soft roll 16. The steel roll 14 and the soft roll 16, as well as the other calender rolls that may be hard or soft rolls, may be arranged in a vertical stack wherein the sheet material 12 passes between the rolls in a path having a general "S" shape configuration. Fly rolls 18 may be provided on the sides of the calender stack to facilitate the movement of the paper through the stack.

A glossy surface finish is created on one side of the paper sheet material 12 as the paper passes between the steel roll 14 and the adjacent soft roll 16. The glossy surface finish is created only on the side 20 of the paper that has been softened with heat and/or moisture and then pressed against the surface of the steel roll 14 by the soft roll 16. An atomized water shower device 22 and a heater device 240 are placed adjacent to the side 20 of the paper to be given a glossy surface finish. The shower device 22 and heater device 240 are placed upstream of the steel roll 14, referring to the direction of travel of the paper relative to the roll 14. Moisture is applied to the surface of the paper 20 by the shower device 22, while heat is applied to the same surface of the paper 20 by the heater device 240. The heat and moisture soften the surface of the paper 20 before the paper is pressed and squeezed by the steel roll 14 against the surface of the soft roll 16. A glossy surface finish is formed on the side 20 of the paper 12 against which heat and moisture have been applied and which comes into contact with the steel roll 14. A steam box 26 may also be provided for jetting steam against the paper as it passes through the calender stack. The heater device 240, and shower device 22 of the present invention may be place of or in addition to the steam box device 26 that uses steam to simultaneously apply heat and moisture to the paper 12. In the embodiment shown, the steam box 26 is applying steam to the opposite side 28 of the paper from that of the heater and shower devices 240 and 22, respectively. Alternatively, the steam box 26 could be located such that it applies steam to the same side of the paper 20. An example of such a steam box device is disclosed in greater detail in commonly assigned U.S. Pat. No. 4,786,529 to Boissevain. This patent is incorporated herein by reference.

Figure 2:
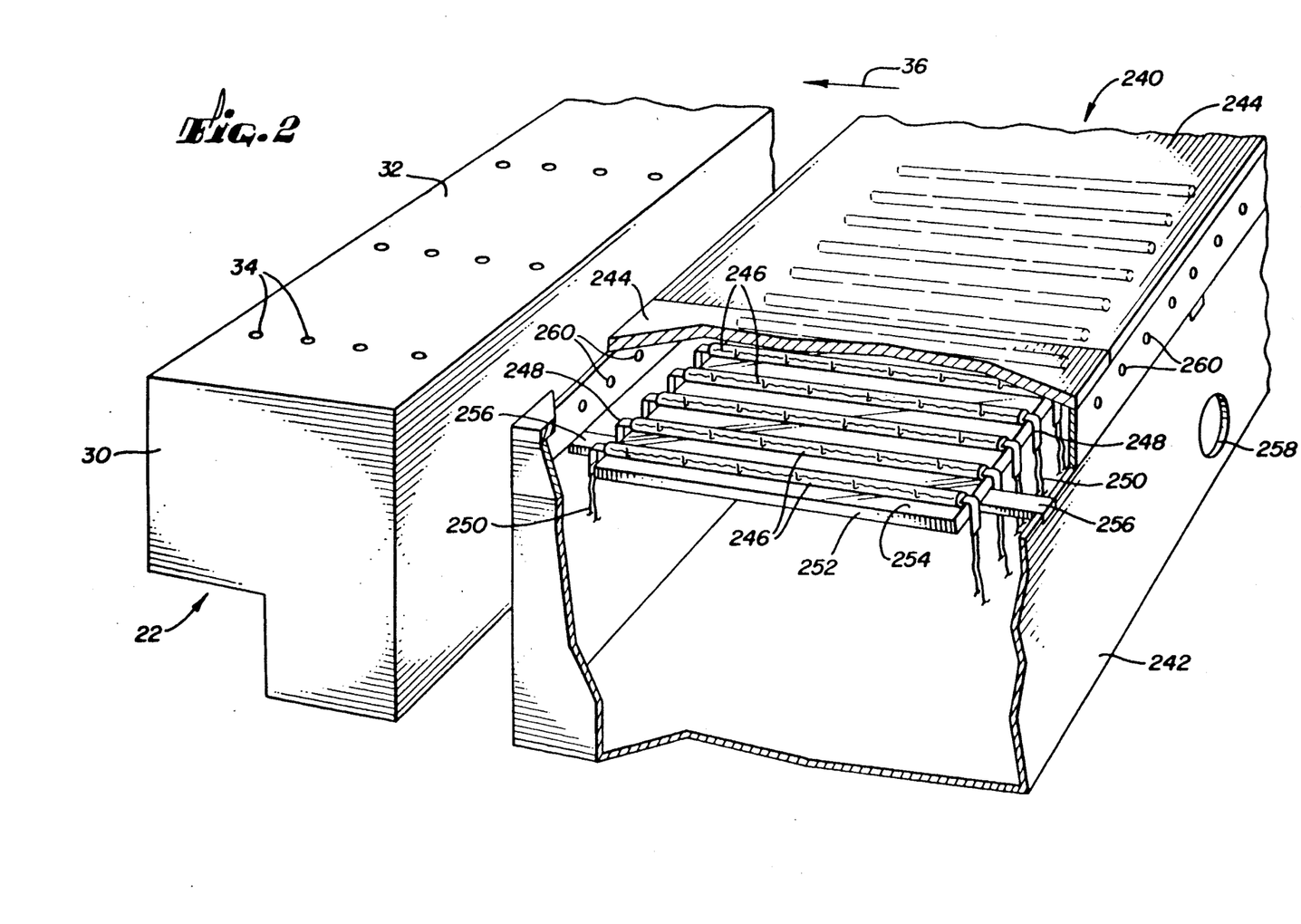
FIG. 2 is a perspective, partially cut-away view of one embodiment of the present invention.

As illustrated in FIG. 2, separate housings are provided for applying heat and for applying moisture to the paper, respectively. Moisture is applied to the paper by a shower device 22 that consists of a housing 30 with a flat surface 32 that is positioned adjacent to the underside of the paper 20. (See FIG. 1). The upward facing surface 32 is provided with a plurality of atomizing water spray nozzles 34. The paper moves relative to the housing 30 in the direction shown by the arrow 36. The water spray nozzles 34 are provided in groups of four running in the machine direction, the direction shown by the arrow 36. Each of the groups is located approximately six inches apart in the cross-direction, perpendicular to the arrow 36. In the illustrated embodiment of FIGS. 2-3, groups. Three of four water spray nozzles are shown for simplicity of understanding. It is to be understood, however, that the housing 30 would normally extend in the cross-direction for as long as necessary to moisturize the entire width of the sheet, which can be as much as 25 feet or more in the cross-direction. Each of the spray nozzles 34 has a spray pattern with a water spray in the cross-direction of approximately 10 inches. Thus, there is some overlap between the spray pattern of the adjacent rows of spray nozzles 34, thereby ensuring coverage over the entire surface of the paper 12.

According to one aspect of the present invention, the temperature control (heating) and moisturizing functions are decoupled. However, upon atomization, the water will tend to cool and could, therefore, cool the sheet. To avoid this, the atomizing nozzles 34 are preferably supplied with heated water at approximately 180°–190° F. Therefore, after atomization, the atomized water mist will have a temperature of about 140° F., which is approximately the temperature of the sheet at the calender rolls. Thus, the water spray being approximately the same temperature as the sheet, will not substantially affect sheet temperature when the mist contacts the sheet 12. Typically, the atomizing water nozzles 34 will spray the heated water toward the sheet at a rate of up to about 0.01 gallon per minute per nozzle such that the mist will contact the sheet at a velocity of about 5 feet per minute. The above numbers for temperature, water volume and velocity are given as examples only, and may vary significantly depending upon the particular circumstances.

FIG. 2 also shows a perspective cut-away view of the infrared heater device 240. This heater device 240 comprises a housing 242 with a flat top surface 244 that is positioned adjacent the underside of the paper 12. The top surface 244 comprises a plurality of quartz panes, or windows, that are heat resistant, substantially transparent to infrared energy, and removable for maintenance. Behind the quartz panes are a plurality of elongated infrared heating lamps 246. Each end of the infrared heating lamps 246 ends in a metal contact clip 248 which, in turn, is connected by an electrical wire clip 250 to a source of electrical energy for the infrared lamp 246. For simplicity, the details of the electrical connections are not illustrated. The electrical connections and clips 250 are rigid enough that the infrared lamps 246 are held suspended within the housing 242, the lamps 246 being as close to the underside of the quartz panes of the top surface 244 as practical. Preferably, the infrared lamps 246 are approximately 12 inches long and are spaced apart in the cross-direction at one inch intervals. Also suspended within the housing 242 are a plurality of adjacent panels 252. The panels are located immediately behind the infrared lamps 246, adjacent the side of the infrared lamps 246 opposite the quartz panes of the top surface 244. The panels 252 comprise a heat insulating material, with the panel surface adjacent the infrared lamps 246 having a reflective coating 254. The reflective coating 254 serves to reflect and direct the infrared radiation from the lamps 246 outwardly through the quartz panes of the top surface 244 onto the paper surface. The panels 252 are suspended within the housing 242 by a plurality of supporting bars 256 extending from the panels 252 to the wall of housing 242. The supporting bars 256 are provided at regular intervals generally at each end of the panels 252 that are, for example, 12 inches in length.

Due to the intense heat generated by the infrared lamps 246, the metal contact clips 248 and electrical wire clips 250 may become very hot. For this reason, sufficient cooling must be provided for the metal contact clips 248 and electrical wire clips 250. For this purpose, a side wall of the housing 242 is provided with an air entry port 258. Air enters the housing through this port 258. The air flow into the housing 242 may be created by a blower motor (not illustrated) located within the housing 242, or a blower may be located external to the housing 242 to provide an airflow into the housing 242, the blower being coupled to the housing 242 by a hose (not illustrated) that connects to the port 258. A plurality of holes 260 are provided in the side walls of the housing 242 adjacent the infrared lamps 246. Preferably, the holes 260 are of approximately $\frac{1}{8}$ inch diameter and are spaced apart in 1 inch intervals, one hole 260 being provided in the side wall of the housing opposite each infrared lamp 246. It has been found that the airflow through the housing 242 will be properly channeled to cool the lamps if the total cross-sectional area of the air holes 260 is equal to approximately $\frac{1}{2}$ the cross-sectional area of the housing itself. The volume of the airflow may be adjusted so as to provide sufficient cooling. Once the airflow enters the housing 242 through the port 258, the airflow can only exit the housing 242 through the air holes 260. This forces the airflow to pass over the metal contact clips 248 and electrical wire clips 250, thus cooling them.

If it is necessary to perform maintenance on the structure, such as replacing a failed infrared lamp 246, one or more of the quartz panes of the top surface 244 may be removed and the infrared lamp 246 replaced by undoing the metal contact clips 248, and electrical wire clips 250, replacing the lamp 246, and re-connecting the metal contact clips 246. The quartz panes are then placed back in position.

Figure 3:
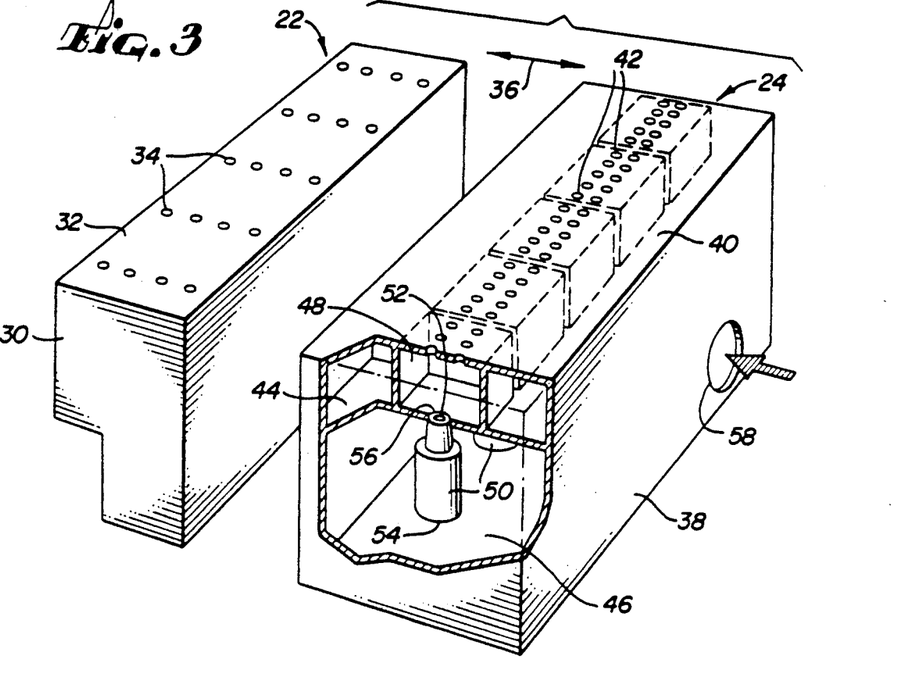
FIG. 3 is perspective, partially cut-away view of another embodiment of the present invention.

FIG. 3 shows a perspective view of an embodiment of the shower device 22 and of an alternative partially cut-away embodiment of the heater device 24. As discussed before, the shower device 22 consists of a housing 30 with a flat surface 32 adjacent the underside 20 of the paper 12 (see FIG. 1). The upward facing of the flat surface 32 is provided with a plurality of atomizing spray nozzles 34. The paper moves relative to the housing 30 in the direction shown by the arrow 36. The spray nozzles 34 are provided in groups of four running in the machine direction, the direction shown by the arrow 36. Each of the groups is located approximately six inches apart in the cross direction, perpendicular to the arrow 36. In the illustrated embodiment, 5 groups of spray nozzles 34 are shown for simplicity of understanding. Each of the spray nozzles 34 has a spray pattern with a water spray in the cross direction of approximately ten inches. Thus, there is again some overlap between the spray pattern of the rows of spray nozzles 34, thereby ensuring uniform coverage over the entire surface 20 of the paper 12.

The heater device 24 illustrated in FIG. 3 comprises a housing 38 with a flat top surface 40 that is positioned adjacent the underside 20 of the paper 12. The top surface 40 includes a plurality of holes 42 that extend in two rows in the cross direction of the top surface 40 across the width of the paper 12. The holes 42 have a spacing of approximately four holes per square inch, the holes 42 having a diameter of approximately 0.090 inches. Other configurations and diameters of holes 42 may also be used, so long as a uniform distribution of air is achieved across the paper surface.

Internally, a partition wall 44 defines an air chamber 46 within the housing 38. Within the housing 38 opposite the air chamber 46 are a plurality of individual plenum chambers 48 that are provided within the housing in the cross direction, each plenum chamber 48 corresponding to one section of the paper in the cross direction. Each plenum chamber 48 has associated with it a heater canister 50 that is open at both ends. A first end 52 of the heater canister has a conical shape for accelerating the flow of air out through the canister and into the plenum chamber 48. The heater canister 50 is attached to the partition wall 44 at the first end 52. The opposite end of the heater canister is open so as to provide an entry point for an air flow. A hole 56 is provided in the partition wall 44 at the point where the first end 52 of the heater canister is attached.

A side wall of the housing 38 is provided with an air entry port 58. Air enters the air chamber 46 through this port 58. The only exit from the air chamber 46 for the incoming air is to pass through each of the heater canisters 50, out the first end 52 and through the holes 56 in the partition wall, into each of the plenum chambers 48, and out the plurality of holes 42 in the top surface 40 of the housing 38. The air flow may be created by a blower motor (not illustrated) located within the housing 38, or a blower may be located external to the heater device 24 to provide an air flow, the blower being coupled to the housing 38 by a hose (not illustrated) that connects to the port 58. Within each heater canister 50 there is located a plurality of electrical coil heating elements (not illustrated) which controllably heat the air flow as it passes through the canister 50. These heating elements are sufficient to provide a heating output of three kilowatts each. The air flow through the air chamber 46 is on the order of 20 cubic feet per minute per foot in the cross-direction. Typically, the heated air emerges from the holes 42 at a velocity of approximately 400 feet per second and a temperature of 700° F. However, again, these values are provided as an example only, and air velocity and temperature could vary widely depending upon the particular circumstances.

Figure 4:
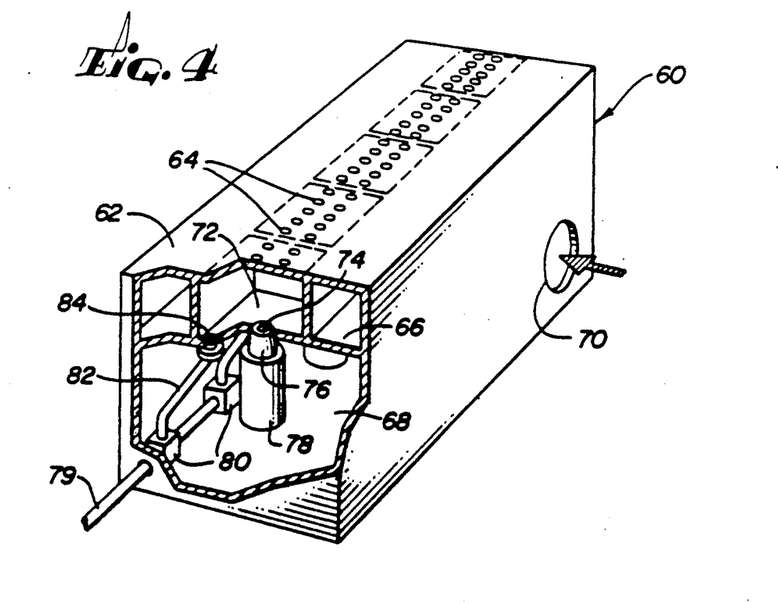
FIG. 4 is a perspective, partially cut-away view of yet a third embodiment of the present invention.

As an alternative to providing separate housings for the shower device and heater device, a single housing may be provided to perform both functions. An embodiment of this alternative is illustrated in FIG. 4, which shows a single housing 60 that incorporates the heating and moisturizing functions. Outwardly, the housing 60 resembles the heating device 24 discussed previously with respect to FIG. 3. A flat top surface 62 of the housing 60 is located adjacent to the paper on the side of the paper that will be provided with a glossy surface finish. A plurality of holes 64 are provided in the cross direction of the housing 60, across the width of the paper. Internally, a partition wall 66 divides the housing 60 and creates an air chamber 68. An air entry port 70 is located in a side wall of the housing and opens into the air chamber 68. Within the housing there are provided a plurality of plenum chambers 72 on the side of the partition wall 66 opposite the air chamber 68. Each of these plenum chambers 72 includes an air entry opening 74 which receives a first conical end 76 of an open-ended air heater canister 78. As with the heater device 24 described with reference to FIG. 3, an air flow enters the housing 60 by means of the air entry port 70. The air then flows into each of the heater canisters 78, passes over electrical heating coils within the canisters (not illustrated), out the conical end 76 of each canister 78 into each of the plenum chambers 72, and out the holes 64 of the housing top surface 62, where the stream of air contacts the moving sheet of paper.

In the embodiment illustrated in FIG. 4, the moisturizing function is incorporated into the housing 60. For this purpose, a water supply line 79 passes within the air chamber 68. A stream of water is made to flow within the water supply line. A water control device 80 (such as a valve) is provided in the same number as there are plenum chambers 72. Thus, there is one water control device 80 for each plenum chamber 72. A flow hose 82 leads from each control device 80 to a plenum chamber 72. Each water control device 80 regulates the amount of water passing within the flow hose 82, either by controlling the water pressure in the flow hose or by controlling the flow rate within the hose. The regulating may be continuously varied or may be accomplished in a step-wise fashion. The flow hose 82 ends in a spray nozzle 84 that opens into the plenum chamber 72. The spray nozzle 84 atomizes the water stream, creating a fog or mist within the plenum chamber 72. The flow of air from the heater canister 78 mixes with the spray mist in the plenum chamber 72. The combination of heated air and spray mist then passes through the holes 64 and comes into contact with the paper.

In the embodiment illustrated in FIG. 4, it is still possible to independently control the amount of heat and the amount of moisture applied to the surface of the paper. As before, the amount of heat applied can be controlled by controlling the amount of electrical energy supplied to the heating coils of the heater canisters 78. The amount of moisture supplied from each plenum chamber 72 can be simultaneously and independently controlled by the water control devices 80. The location of the nozzle 84 within the plenum chamber 72 is not critical, as long as the spray pattern developed by the nozzle 84 is widely dispersed. A widely dispersed spray pattern allows the water droplets comprising the atomized water flow to mix with the heated air flow from the heater canister 78.

Figure 5:
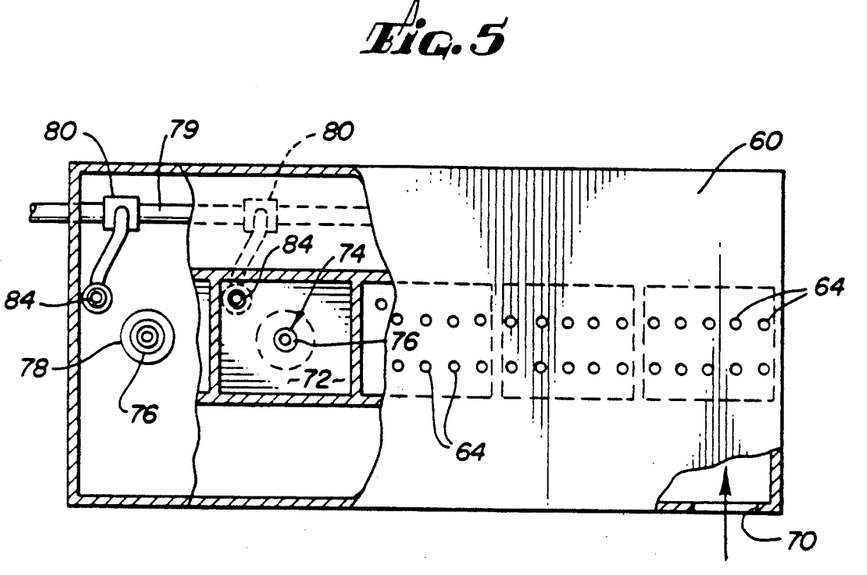
FIG. 5 is a partially cut-away top view of the present invention illustrating the internal structure of the housing of FIG. 4.

FIG. 5 shows a sectional plan view of the embodiment illustrated in FIG. 4. It is to be understood that this view also shows the internal structure of the FIG. 3 embodiment, if one were to delete the elements associated with the water spray.

As shown in FIG. 1, a gloss sensor 100 may be provided at a location downstream of the heating and moisturizing units 240, 22. The gloss sensor 100 monitors the surface gloss of the paper surface 20 and provides a signal corresponding to the degree of surface gloss to control devices for heating 102, moisturizing 104, and steam control 106. Depending on the deviation in the measured surface gloss of the paper from the predetermined desired surface gloss, the various control devices 102, 104, and 106 may selectively transmit control signals to the associated devices. As noted, these devices may then adjust the amount of steam provided through valves associated with the steam box 26, the amount of electrical energy supplied to electrical heating coils or infrared lamps of the heating device 240, or the water flow or pressure provided to spray nozzles of the shower device 22. In this way, the appropriate amounts of heat, moisture and steam are provided to the paper surface. Preferably, the gloss sensor 100 is of the scanning type, in which a gloss detector scans repeatedly back and forth across the width of the paper in the cross direction. The control devices (one of 102, 104, and 106) are calibrated with the gloss sensor 100 so that the amount of steam, heat, and moisture delivered to each cross-sectional area of the sheet will be the appropriate amount needed for obtaining the desired gloss, based on the signal from the gloss sensor for that section of the paper. The amounts of steam, heat and moisture required to effect a desired change in gloss can be determined by prior experimentation.

A second gloss sensor 108 may also be provided for the second surface 28 of the paper. The second gloss sensor 108 operates in conjunction with the steam box 26 and/or heating and moisturizing devices 60 for the appropriate side 28 of the paper 12.

In summary, the present invention provides a system for controlling the degree of surface gloss across a sheet material by selectively and independently varying the amount of heat and moisture applied to the surface of the sheet material. The heat and moisture may be applied through either separate housings or a single, unitary housing. Furthermore, the heat and moisture may be applied in place of or in addition to other amounts of heat and moisture applied to the surface of the sheet material, such as heat and moisture applied in the form of steam. Surface gloss sensors may be used to detect the degree of surface gloss of the sheet material. The signals generated by the surface gloss sensors may be fed to various independent device controllers, e.g., 102, 104 and 106 or, alternatively, to the paper mill process control computer. In either event, the gloss signals are used to control the amount of heat applied to forced air or infrared heaters, to control the amount of water flow provided to atomizer nozzles and/or the steam provided by the steam box 26 in accordance with the detected gloss.

Preferably, a single computer, such as the paper mill process control computer, receives the gloss signals in conjunction with signals from other sensors (not shown) such as sheet caliper sensors, and controls the amounts of steam, hot air or infrared radiation and atomized mist so as to achieve a sheet having both the desired gloss and caliper profiles. For example, when the system of the present invention includes the sectionalized steam box device 26, the process control computer could be programmed to control how much heat, steam and atomized mist is applied to any given cross-directional section depending upon how much the gloss in that section needs to be increased or decreased to meet a desired target and how much the sheet caliper for that section needs to be increased (higher mist/steam and heat ratio) or decreased (higher steam and heat/mist ratio) to meet the desired caliper target.

It will be understood that various modifications may be made to the disclosed embodiments without departing from the spirit and scope of the invention. For example, the top surface of the housing having the plurality of holes or nozzles may be somewhat curved to fit closely adjacent the sheet as it passes over a curved surface of a calender roll, thereby eliminating the need for fly rolls 18. Also, the size, number, and distribution pattern of the holes and nozzles may be modified in accordance with particular objectives. The spacing of the housings relative to the steel rolls may be varied, and the sequence of the housings when separate moisturizing and heating housings are used may be varied i.e., heat may be applied before, after, or simultaneously with moisture. Also, although the present invention is described with respect to the surface gloss of a paper sheet, the invention may also be used to control the heat and moisture applied to other types of sheet materials or to control physical characteristics other than surface gloss, such as, for example, sheet smoothness. Moreover, although not so illustrated in FIG. 1, in certain situations it may be preferred to place the steam box, water shower and heater devices as far downstream on the calender stack as practical, so as to minimize coupling between caliper and gloss which may occur, for example, because of heat transferred from the sheet to the calender rolls. Finally, working fluids other than water and air may be used for the moisturizing and heating functions, or various additives may be mixed with the water without departing from the principles of the present invention. Accordingly, it is to be understood that the invention is not to be limited by the specific illustrated embodiments, but only by the scope of the appended claims and equivalents thereof.

What we claim is:

1. a system for calendering a sheet, comprising:
    a calender stack including a plurality of calender rolls, wherein the calender stack has an upstream end and a downstream end and at least one nip formed between adjacent rolls;
    a sheet heater, disposed adjacent to a nip of the calender stack, wherein the heater is controllable to emit variable amounts of dry heat; and
    a sheet moisturizer, disposed adjacent to a nip of the calender stack, wherein the moisturizer is controllable independently of the heater to emit variable amounts of an atomized fluid.

2. A system as claimed in claim 1, further comprising:
    a finish sensor, disposed downstream of the calender stack, wherein the finish sensor is operable to generate finish signals indicative of a sensed characteristic of the surface of the calendered sheet;
    a caliper sensor, disposed downstream of the calender stack, wherein the caliper sensor is operable to generate caliper signals indicative of the caliper of the calendered sheet; and
    at least one controller, operatively coupled to the finish sensor, the caliper sensor, the heater and the moisturizer, to receive the finish and caliper signals and to independently control the heater and moisturizer based upon the finish and caliper signals and predetermined finish and caliper values.

3. A system as claimed in claim 1, wherein the heater is an infrared heater.

4. A system as claimed in claim 1, wherein the heater includes multiple independently controllable dry heating elements spaced at intervals along the cross-direction of the stack, and wherein the moisturizer includes a plurality of fluid-atomizing nozzles and associated independently controllable valves disposed at intervals along the cross-direction of the stack, such that the heater and moisturizer are operable to emit independently controllable amounts of heat and fluid, respectively.

5. A system as claimed in claim 4, further comprising a fluid heater operatively coupled to the nozzles for heating the fluid prior to atomization by the nozzles.

6. A system as claimed in claim 1, further comprising a sheet in the at least one nip of the calender stack.

7. A system as claimed in claim 6, wherein the moisturizer includes a plurality of fluid atomizing nozzles and associated independently controllable valves such that the moisturizer is operable to emit independently controllable amounts of fluid from each nozzle, the system further comprising a fluid heater for heating the fluid prior to atomization by the nozzles to a temperature such that the atomized fluid has substantially the same temperature as the sheet.

8. A method for calendering a sheet, comprising the steps of:
    calendering a sheet between adjacent surfaces;
    applying a variable amount of an atomized fluid to the sheet surface substantially immediately before calendering;
    applying a variable amount of heat to the sheet substantially immediately before calendering; and
    independently controlling the amount of heat and fluid applied to the sheet.

9. A system as claimed in claim 8, further comprising the step of measuring at least one physical characteristic of the sheet, wherein the amount of heat and fluid applied to the sheet is controlled based upon the at least one measured physical characteristic and at least one predetermined desired value of the at least one characteristic.

10. A system as claimed in claim 9, wherein the at least one physical characteristic includes sheet gloss.

11. A system as claimed in claim 9, wherein the at least one physical characteristic includes sheet smoothness.

12. A system as claimed in claim 8, wherein the sheet is calendered between a smooth, hard surface and an adjacent resilient surface.

13. A system as claimed in claim 8, wherein the fluid is water mist.

* * * * *